Feb. 12, 1957  D. A. COOKE  2,781,478
ELECTRICAL RELAY CIRCUIT
Filed July 13, 1953
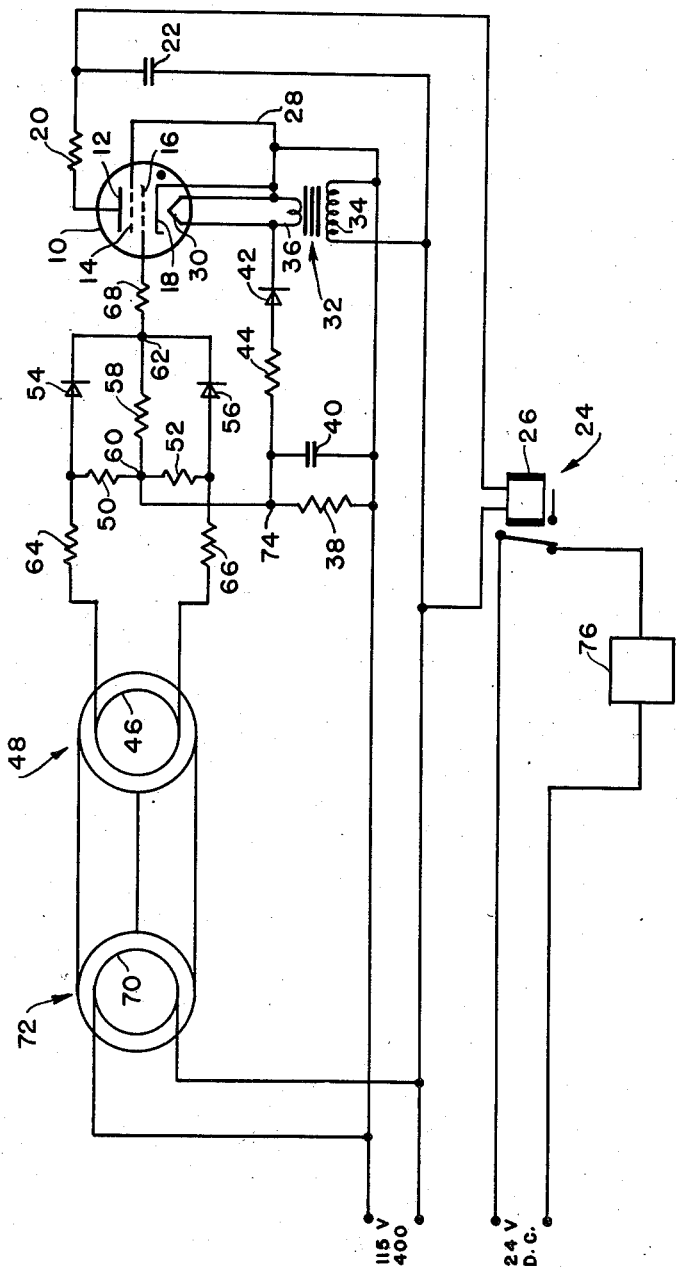
INVENTOR.
DAVID A. COOKE
BY
ATTORNEYS United States Patent Office 2,781,478
Patented Feb. 12, 1957

2,781,478

ELECTRICAL RELAY CIRCUIT

David A. Cooke, Sharon, Pa., assignor, by mesne assignments, to the United States of America as represented by the Secretary of the Navy Application July 13, 1953, Serial No. 367,467

2 Claims. (Cl. 317—142)

This invention relates to an electrical circuit, and in particular to a detector and trigger circuit particularly suitable for use in a device such as described in U. S. application No. 365,441, filed July 1, 1953, by Harry E. Ellerman, Jr., and entitled "Anti-Circular Run Device."

In the above identified application the detector and trigger circuit comprising this invention is used to detect, or measure, the amplitude of an error voltage obtained from a synchro control transformer, and when the error voltage exceeds a predetermined magnitude, the circuit is operative to pass a large electrical current through a coil of a relay which stops the flow of power to the propulsion means of a torpedo.

It is an object of this invention to provide a detector and trigger circuit which accurately measures, or detects, the amplitude of an A. C. potential, irrespective of the phase of the A. C. potential and is operative when said potential exceeds a predetermined magnitude to cause a large current to flow through the trigger portion of the circuit.

It is another object of this invention to provide a detector and trigger circuit in which the physical assembly is compact and which requires but a single power supply.

Other objects and many of the attendant advantages of this invention will be readily appreciated as the same becomes better understood by reference to the following detailed description when considered in connection with the accompanying illustration.

Thyratron 10 has an anode 12, a shield grid 14, a control grid 16, and an indirectly heated cathode 18. The anode circuit of thyratron 10 comprises a resistor 20 connected in series with the parallel connected condenser 22 and relay 24. The coil 26 of relay 24 may be regarded as the effective load impedance of the anode circuit. The cathode of thyratron 10 is connected by conductor 28 to shield grid 14, serving to provide improved thyratron operation. The power supply from a source which is not illustrated is 115 v. single phase 400 cycle A. C. which is applied to the anode and cathode circuits of thyratron 10.

The heater circuit for cathode 18 of thyratron 10 comprises a heating element 30, and a transformer 32 which provides low-voltage A. C. for element 30. The primary coil 34 of transformer 32 is connected to the 115 v. 400 cycle A. C. source, and the secondary coil is connected to the heating element 30.

The bias voltage for control grid 16 is provided by a bias circuit which includes parallel connected resistor 38 and condenser 40 which are connected in series with rectifying element 42 and resistor 44. The bias circuit is connected across the secondary coil 36 of transformer 32 in parallel with heater element 30.

Error voltages from a source such as rotor 46 of synchro control transformer 48 are applied to a full wave rectifying network which includes equal resistors 50, 52 which are connected in series, and rectifying elements 54, 56 which are also connected in series. The series connected resistors and rectifying elements are then connected in parallel. Load resistor 58 is connected between terminal 60, which is between resistors 50, 52, and terminal 62, which is between rectifying elements 54, 56. The error voltage from rotor 46 is applied across resistors 50, 52 by a circuit which includes equal resistors 64, 66. A D. C. path is completed from cathode 18 to control grid 16 through resistor 38, load resistor 58, and resistor 68.

In operation, 115 v. 400 cycle A. C. is applied to the rotor 70 of synchro generator 72, to the primary coil 34 of transformer 32, and across cathode 18 and anode 12 of thyratron 10 through coil 26 of relay 24. A portion of the current induced in the secondary coil 36 of transformer 32 flows through heater element 30 to raise the temperature of cathode 18 to its operating level. A C. from the secondary coil 36 also flows through the bias circuit in the direction permitted by rectifying element 42, so that terminal 74 of resistor 38 will be at a lower potential than cathode 18. Condenser 40 effects a smoothing action so that the potential at terminal 74 is substantially constant.

The full wave rectifying network causes a pulsating direct current to flow from terminal 62 to terminal 60 through load resistor 58, when an error voltage is induced in rotor 46 of synchro control transformer 48. This current is not affected by the phase of the voltage induced in rotor 46. When the current is flowing through resistor 58, the potential of terminal 62 is higher than the potential of terminal 60. It is thus the sum of the voltage drops across resistor 38 and resistor 58 which is applied through resistor 68 to control grid 16.

The magnitude of the voltage drop across resistor 58 is a function of the magnitude of the error voltage induced in rotor 46 of synchro control transformer 48, which in turn is a function of the angular error between rotor 70 of synchro generator 72 and rotor 46 of synchro control transformer 48. It therefore follows that the potential drop across resistor 58 is likewise a function of the error between the positions of rotor 46 and rotor 70. By a suitable choice of circuit constants, the potential of the grid 16 of thyratron 10 can thus be raised to the critical level where thyratron 10 will conduct when the magnitude of the error between rotor 70 and rotor 46 exceeds any predetermined angle. When thyratron 10 conducts, a large current will flow through coil 26 of relay 24, for the particular connection shown causing the relay contacts to open to prevent 24 v. D. C. from flowing through load 76. Condenser 22 which is connected in parallel with the coil 26 of relay 24 tends to maintain the current through coil 26 in the brief intervals between firings of thyratron 10, and thus insures hold-in action of relay 24 during predetermined angular error condition.

In one representative circuit, components of the following types and values were found to be desirable:

| | |
|---|---|
| Resistor 20 | 1000 ohms. |
| Condenser 22 | 0.5 mfd., 200 v. |
| Transformer 32 | 115/6.3 v. |
| Resistor 38 | 100K ohms. |
| Condenser 40 | 0.5 mfd., 20 v. |
| Rectifying element 42 | 1N 34 crystal. |
| Resistor 44 | 1000 ohms. |
| Resistor 50 | 100K ohms. |
| Resistor 52 | 100K ohms. |
| Rectifying element 54 | 1N 38 crystal. |
| Rectifying element 56 | 1N 38 crystal. |
| Resistor 58 | 100K ohms. |
| Resistor 64 | 560 ohms. |
| Resistor 66 | 560 ohms. |
| Resistor 68 | 1 meg ohm. |
| Thyratron 10 | 2D21. |
| Relay 24 | Clare K 1A. |

Obviously many modifications and variations of the present invention are possible in the light of the above teachings. It is therefore to be understood that within the scope of the appended claims the invention may be practiced otherwise than as specifically described.

What is claimed is:

1. For use with equipment employing a utilization circuit, and means normally functioning to continuously maintain a displacement-error at substantially zero magnitude, an electrical apparatus for controlling energization of said utilization circuit by switch-over action therein in response to a displacement-error exceeding a predetermined magnitude, said apparatus comprising: means for providing an error signal corresponding in phase and amplitude to the direction and magnitude, respectively, of said displacement-error; means for converting said error signal to a unipolar voltage corresponding in magnitude to said displacement-error; current-controlling means connected to be triggered by said unipolar voltage when said displacement error exceeds said predetermined magnitude; and relay means energized by triggering of said current-controlling means to provide switch-over action in said utilization circuit.

2. For use with equipment employing a utilization circuit, and means normally functioning to continuously maintain a displacement-error at substantially zero magnitude, an electrical apparatus for controlling energization of said utilization circuit by switch-over action therein in response to a displacement-error exceeding a predetermined magnitude, said apparatus comprising: means for providing an error signal corresponding in phase and amplitude to the direction and magnitude, respectively, of said displacement-error; rectifier means for converting said error signal to a unipolar pulse voltage corresponding in peak amplitude to said displacement-error; thyratron means connected to be fired said unipolar pulse voltage when of peak amplitude corresponding to a displacement-error exceeding said predetermined magnitude; and relay means, including a hold-over capacitor, connected to be energized by firing of said thyratron means to provide switch-over action in said utilization circuit.

References Cited in the file of this patent

UNITED STATES PATENTS

| | | |
|---|---|---|
| 2,297,836 | Levy | Oct. 6, 1942 |
| 2,471,834 | McDowell et al. | May 31, 1949 |
| 2,478,279 | Kochenburger | Aug. 9, 1949 |
| 2,483,126 | Davids | Sept. 27, 1949 |
| 2,497,202 | Beard | Feb. 14, 1950 |
| 2,504,768 | Watson | Apr. 18, 1950 |
| 2,505,368 | Shenk et al. | Apr. 25, 1950 |
| 2,563,740 | Parker | Aug. 7, 1951 |
| 2,607,005 | Holt | Aug. 12, 1952 |
| 2,607,907 | Marshall | Aug. 19, 1952 |
| 2,610,311 | Phillips et al. | Sept. 9, 1952 |
| 2,626,324 | Markusen | Jan. 20, 1953 |